United States Patent
Aksoy

(10) Patent No.: US 11,215,817 B1
(45) Date of Patent: Jan. 4, 2022

(54) SYSTEMS AND METHODS FOR GENERATING SPECTATOR IMAGES OF AN ARTIFICIAL REALITY ENVIRONMENT

(71) Applicant: Facebook Technologies, LLC, Menlo Park, CA (US)

(72) Inventor: Volga Aksoy, Redwood City, CA (US)

(73) Assignee: Facebook Technologies, LLC., Menlo Park, CA (US)

( * ) Notice: Subject to any disclaimer, the term of this patent is extended or adjusted under 35 U.S.C. 154(b) by 0 days.

(21) Appl. No.: 17/111,423

(22) Filed: Dec. 3, 2020

(51) Int. Cl.
*G02B 27/00* (2006.01)
*G06T 19/00* (2011.01)
*G02B 27/01* (2006.01)

(52) U.S. Cl.
CPC ....... *G02B 27/0093* (2013.01); *G02B 27/017* (2013.01); *G06T 19/006* (2013.01)

(58) Field of Classification Search
CPC .. G02B 27/0093; G02B 27/017; G06T 19/006
See application file for complete search history.

(56) References Cited

U.S. PATENT DOCUMENTS

| | | | | |
|---|---|---|---|---|
| 7,626,598 B2 * | 12/2009 | Manchester | .......... | G06F 1/1626 345/659 |
| 2013/0083173 A1 * | 4/2013 | Geisner | ................. | G09G 3/003 348/51 |
| 2014/0368538 A1 * | 12/2014 | Ratcliff | ............. | G06K 9/00885 345/633 |
| 2017/0266554 A1 * | 9/2017 | Marks | ................. | A63F 13/5255 |
| 2017/0269713 A1 * | 9/2017 | Marks | .................... | G06F 3/0346 |
| 2020/0368616 A1 * | 11/2020 | Delamont | ............... | A63F 13/25 |

OTHER PUBLICATIONS

Krekhov A, Preuβ D, Cmentowski S, Krüger J. Silhouette Games: An Interactive One-Way Mirror Approach to Watching Players in VR. InProceedings of the Annual Symposium on Computer-Human Interaction in Play Nov. 2, 2020 (pp. 561-571).*

* cited by examiner

*Primary Examiner* — Sarah Lhymn
(74) *Attorney, Agent, or Firm* — Baker Botts L.L.P.

(57) ABSTRACT

A method includes a computing system receiving a first-person image that captures an artificial-reality environment from a first-person perspective of a user of a head-mounted device, wherein the first-person image is rendered based on a pose of the head-mounted device. Based on the pose of the head-mounted device, the computing system determines a spectator perspective wherein the spectator perspective and the first-person perspective are co-located in a three-dimensional space and the spectator perspective has a predetermined rotational orientation about a view axis. The computing system generates a spectator image that captures the first-person image from the spectator perspective, and causes the first-person image to be displayed by the head-mounted device and the spectator image to be displayed on a device separate from the head-mounted device.

20 Claims, 9 Drawing Sheets

SYSTEMS AND METHODS FOR GENERATING SPECTATOR IMAGES OF AN ARTIFICIAL REALITY ENVIRONMENT

TECHNICAL FIELD

This disclosure generally relates to generating and causing the display of spectator images of an artificial reality environment from a spectator perspective.

BACKGROUND

Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

Methods and systems are provided to permit users of artificial reality systems to share images of their artificial experiences with others. For example, a user playing a gaming application on a virtual reality device may wish to livestream a video of their gameplay experience to others. Particular embodiments described herein reduce or eliminate sudden rotational movements associated with first-person images that may degrade the spectator viewing experience by generating a spectator perspective based on the first-person perspective of the user who is experiencing the artificial reality environment. At a high level, a computing system may receive an image of an artificial reality environment from a first-person perspective of a user experiencing the artificial reality environment. Based on a pose of the head-mounted display, the computing system may determine a spectator perspective and generate a corresponding spectator image that includes, for example, at least a portion of the first-person image of the artificial reality environment from the first-person perspective.

In particular embodiments the computing system may comprise (1) a rendering system that generates or renders the first-person images of the artificial reality environment to be displayed on the HMD; (2) a runtime engine that receives and processes the rendered first-person images and HMD pose information from the rendering system and generates the first-person images and spectator images of the artificial reality environment; and (3) a mirror application that determines a desired spectator perspective and requests the runtime engine to provide a spectator image from a specified spectator perspective. The mirror application may further request that the runtime engine provide, for example, an HMD pose associated with a current first-person perspective and first-person image, and utilize the HMD pose to figure out the desired spectator perspective. In particular embodiments a computing system associated with the artificial reality system of user generates one or more spectator images according to the methods described herein. Thus, the computing system can generate and output, for example, a video file that can be disseminated to one or more spectators by, for example, uploading to a news feed on a social networking platform.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1A:
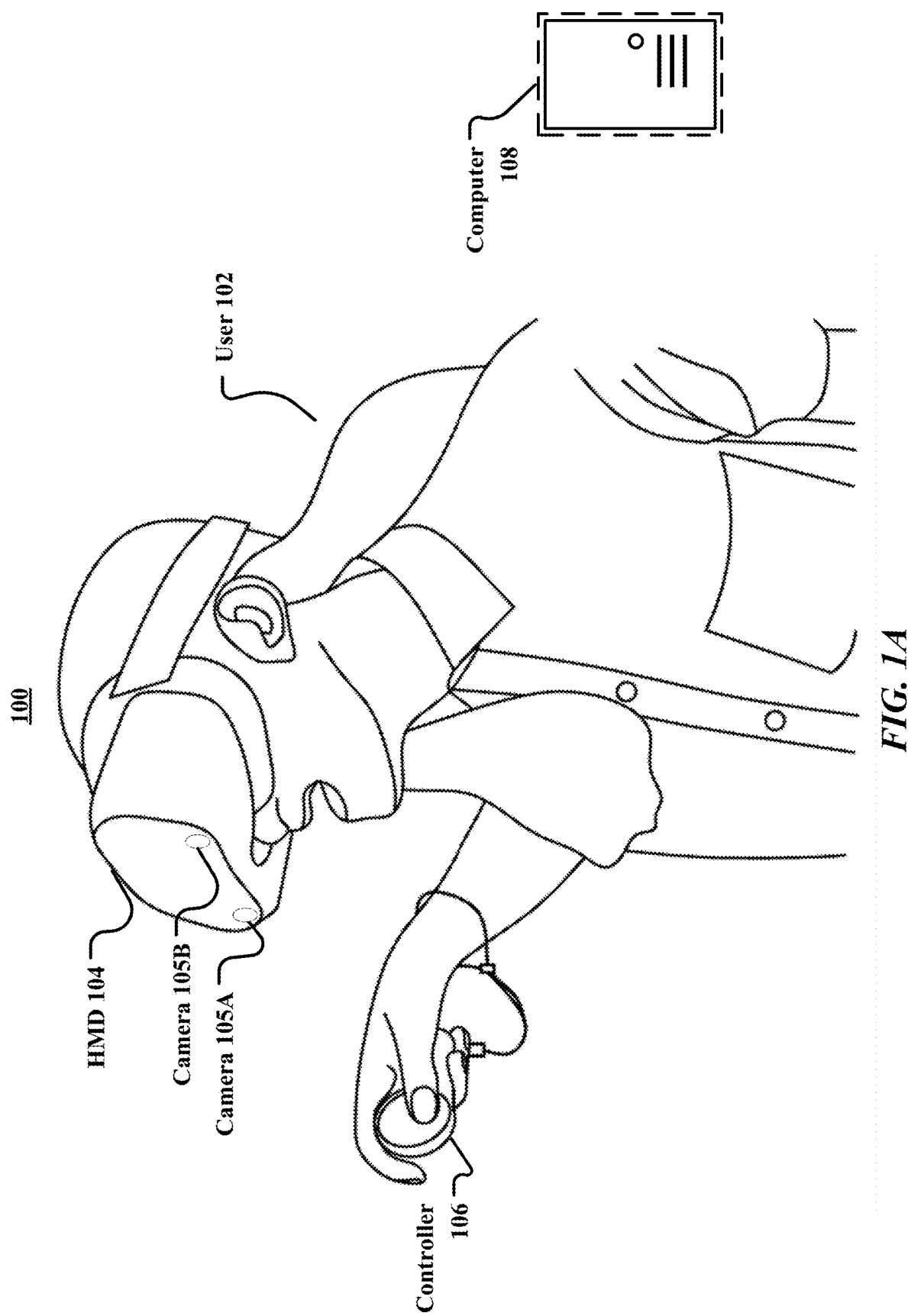
FIG. 1A illustrates an example of an artificial reality system worn by a user.

FIG. 1A illustrates an example of an artificial reality system 100 worn by a user 102. In particular embodiments, the artificial reality system 100 may comprise a head-mounted device ("HMD 104") 104, a controller 106, and a computing system 108. The HMD 104 may be worn over the user's eyes and provide visual content to the user 102 through internal displays (not shown). The HMD 104 may have two separate internal displays, one for each eye of the user 102. As illustrated in FIG. 1A, the HMD 104 may completely cover the user's field of view. By being the exclusive provider of visual information to the user 102, the HMD 104 achieves the goal of providing an immersive artificial-reality experience. One consequence of this, however, is that the user 102 would not be able to see the physical (or real) environment surrounding him, as his vision is shielded by the HMD 104. As such, the passthrough feature described herein is needed to provide the user with real-time visual information about his physical environments.

Referring again to FIG. 1A, the HMD 104 may have external-facing cameras, such as the two forward-facing cameras 105A and 105B shown in FIG. 1A. While only two forward-facing cameras 105A-B are shown, the HMD 104 may have any number of cameras facing any direction (e.g., an upward-facing camera to capture the ceiling or room lighting, a downward-facing camera to capture a portion of the user's face and/or body, a backward-facing camera to capture a portion of what's behind the user, and/or an internal camera for capturing the user's eye gaze for eye-tracking purposes). The external-facing cameras 105A and 105B are configured to capture the physical environment around the user and may do so continuously to generate a sequence of frames (e.g., as a video).

Figure 1B:
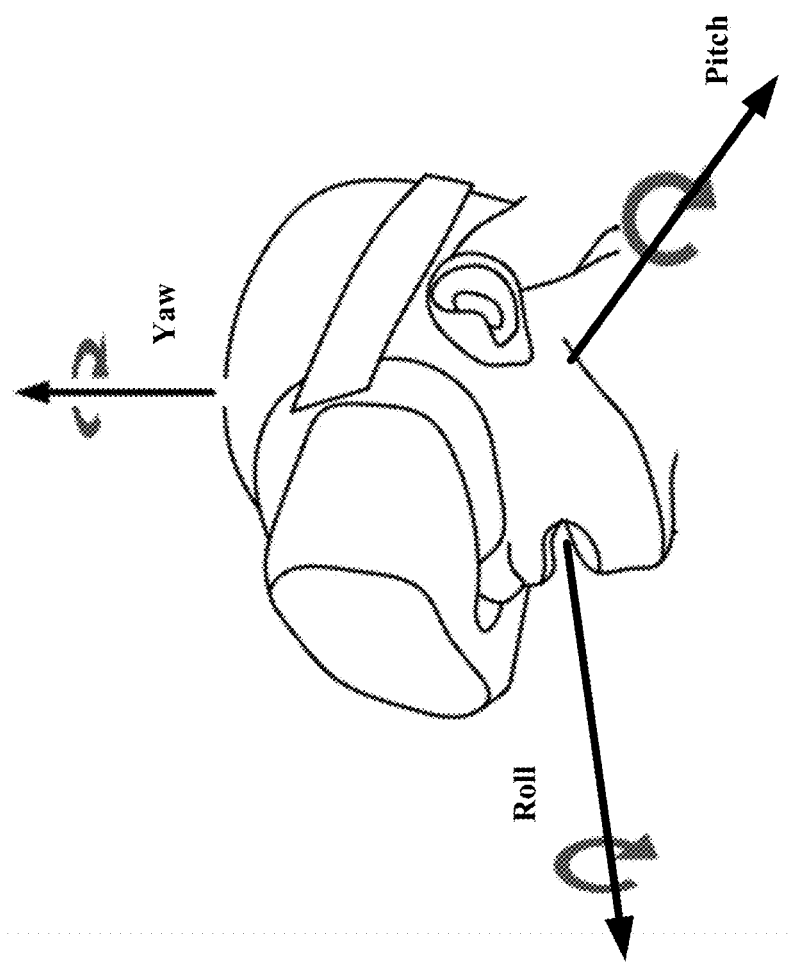
FIG. 1B illustrates three axis of rotation centered around an HMD for determining the orientation of the HMD.

In particular embodiments, the pose (e.g., position and orientation) of the HMD 104 within the environment may be needed. FIG. 1B illustrates three axis of rotation centered around an HMD for determining the orientation of the HMD. As an example, in order to render an appropriate display for the user 102 while he is moving about in a virtual environment, the system 100 would need to determine his position, comprising a coordinate in the virtual environment (e.g., a x, y, z coordinate) and orientation (e.g., a rotational value for the roll, pitch, and yaw axes as depicted in FIG. 1B) at any moment. Based on the pose of the HMD 104, the system 100 may further determine the viewpoint of either of the cameras 105A and 105B or either of the user's eyes. In particular embodiments, the HMD 104 may be equipped with inertial-measurement units ("IMU"). The data generated by the IMU, along with the stereo imagery captured by the external-facing cameras 105A-B, allow the system 100 to compute the pose of the HMD 104 using, for example, SLAM (simultaneous localization and mapping) or other suitable techniques.

In particular embodiments, the artificial reality system 100 may further have one or more controllers 106 that enable the user 102 to provide inputs. The controller 106 may communicate with the HMD 104 or a separate computing unit 108 via a wireless or wired connection. The controller 106 may have any number of buttons or other mechanical input mechanisms. In addition, the controller 106 may have an IMU so that the position of the controller 106 may be tracked. The controller 106 may further be tracked based on predetermined patterns on the controller. For example, the controller 106 may have several infrared LEDs or other known observable features that collectively form a predetermined pattern. Using a sensor or camera, the system 100 may be able to capture an image of the predetermined pattern on the controller. Based on the observed orientation of those patterns, the system may compute the controller's position and orientation relative to the sensor or camera.

The artificial reality system 100 may further include a computer unit 108. The computer unit may be a stand-alone unit that is physically separate from the HMD 104 or it may be integrated with the HMD 104. In embodiments where the computer 108 is a separate unit, it may be communicatively coupled to the HMD 104 via a wireless or wired link. The computer 108 may be a high-performance device, such as a desktop or laptop, or a resource-limited device, such as a mobile phone. A high-performance device may have a dedicated GPU and a high-capacity or constant power source. A resource-limited device, on the other hand, may not have a GPU and may have limited battery capacity. As such, the algorithms that could be practically used by an artificial reality system 100 depends on the capabilities of its computer unit 108.

Users of artificial reality systems often wish to share their experiences with others, either as a livestream as their interact with the artificial reality environment, or as a playback after their experience. For example, a user playing a gaming application on a virtual reality device may wish to livestream a video of a of their gameplay experience to others. When sharing a video of a user experiencing a traditional two-dimensional application, the video can simply be rendered and displayed to a screen of one more spectators without significantly impacting the spectator viewing experience. However, sharing a first-person perspective of a user experiencing an artificial reality environment oftentimes includes video that may suddenly shake, wobble, or jitter due to gameplay vibrations and sudden movements associated with the HMD of the user. While the user of the HMD may be so immersed in the experience that these movements are imperceptible, a spectator (who is often viewing the video on a traditional monoscopic two-dimensional display) may find this disorienting or distracting. It should be appreciated that although this example embodiment is described in the artificial-reality gaming context, this disclosure contemplates integrating an interactive spectating interface with any suitable content, such as a video conferencing application.

Particular embodiments described herein relate to systems and methods reduce or eliminate these sudden rotational movements by generating a spectator perspective of the artificial reality environment based on the first-person perspective of the user who is experiencing the artificial reality environment through for example, an HMD. At a high level, a computing system may receive an image of an artificial reality environment from a first person perspective of a user experiencing the artificial reality environment. Based on a pose of the HMD, the computing system may determine a spectator perspective and generate a corresponding spectator image that includes, for example, at least a portion of the first-person image of the artificial reality environment from the first-person perspective.

In particular embodiments the computing system may comprise or be associated with (1) a rendering system that generates or renders the first-person images of the artificial reality environment to be displayed on the HMD; (2) a runtime engine that receives and processes the rendered first-person images and HMD pose information from the rendering system and generates the first-person images and spectator images of the artificial reality environment; and (3) a mirror application that determines a desired spectator perspective and requests the runtime engine to provide a spectator image from a specified spectator perspective. In particular embodiments the runtime engine may apply one or more processes to the first-person images prior to displaying the images, for example and not by way of limitation applying an inverse distortion to compensate for distortions caused by the display system, reprojecting to account for changes in the user's head pose since the point in time for which the image was rendered, etc.

In order to determine a spectator perspective, the mirror application will request that the runtime engine provide, for example, an HMD pose associated with a current first-person perspective and first-person image, and utilize the HMD pose to figure out the desired spectator perspective. At a high level, if the mirror application simply uses the first-person perspective as the spectator perspective, then the first-person image will be the same image provided to the mirror application as the spectator image. In particular embodiments a runtime engine associated with the computing system of user 102 generates one or more spectator images according to the methods described herein. Thus, the computing system can generate and output, for example, a video file that can be disseminated to one or more spectators by, for example, uploading to a news feed on a social networking platform. However, it should be appreciated that in some embodiments a computing system associated with a spectator can perform the processes described herein, thus permitting the computing system associated with the user 102 to only transmit metadata (comprising the HMD pose, first-person perspective, etc.) and image data that can be utilized by a computing system associated with one or more spectators to generate the spectator images according to the methods described herein. One or more images may be utilized to generate, for example, a video file of the user's artificial reality experience.

Figure 2:
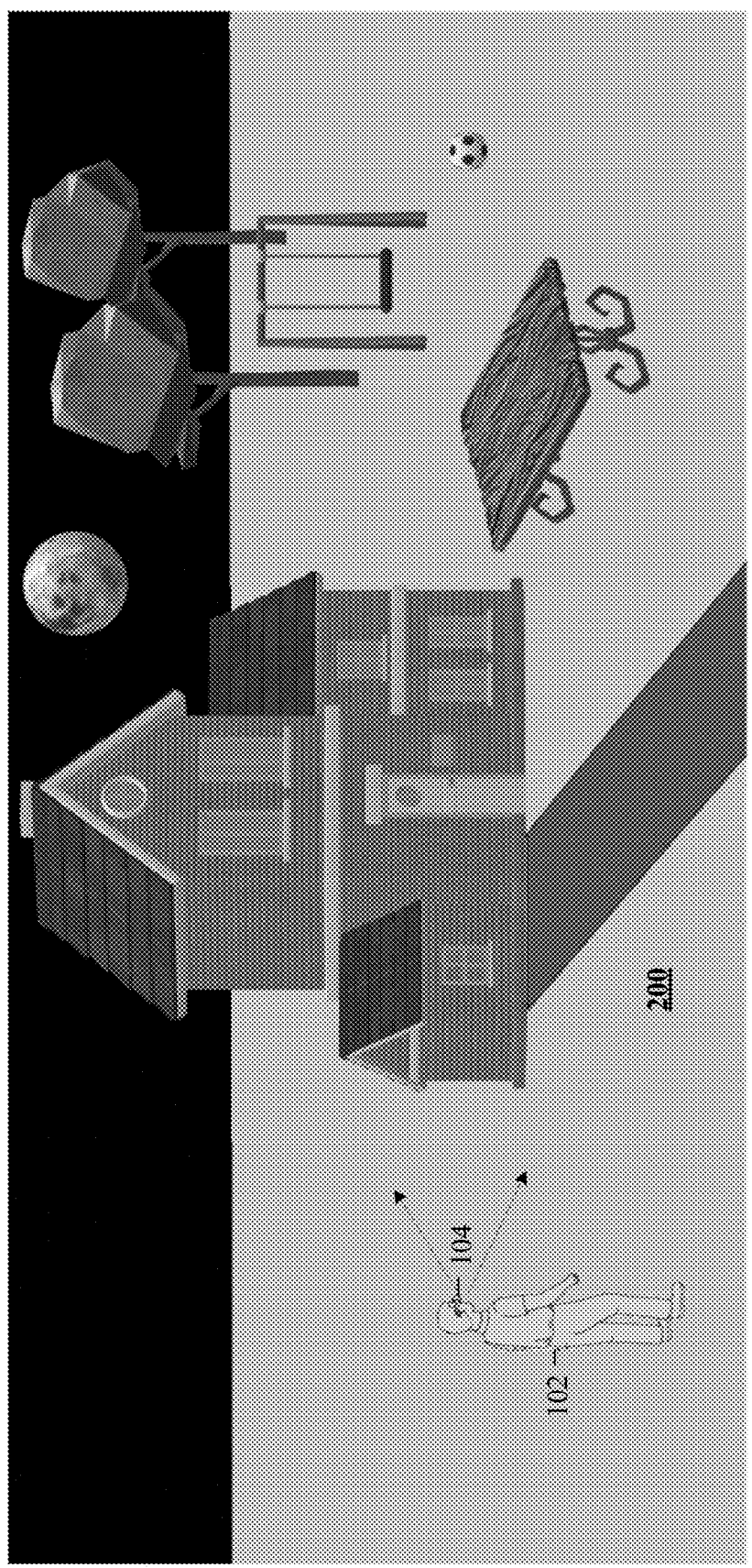
FIG. 2 illustrates a user experiencing an artificial reality environment.

FIG. 2 illustrates a user experiencing an artificial reality environment. As the user 102 moves throughout the artificial reality environment 200, the computing system may determine a pose of the user 102, through for example, a known spatial relationship between the pose of the user 102 and the pose of the HMD 104. The computing system may also determine a first-person perspective, which represents a perspective of the user 102 as they experience the environment 200. In particular embodiments the first-person perspective may comprise a three-dimensional pose of the perspective (e.g., a x, y, z coordinate representing a location, and radians of rotation about the pitch, roll, and yaw axes), as well as a field-of-view of the user 102.

Figure 3A:
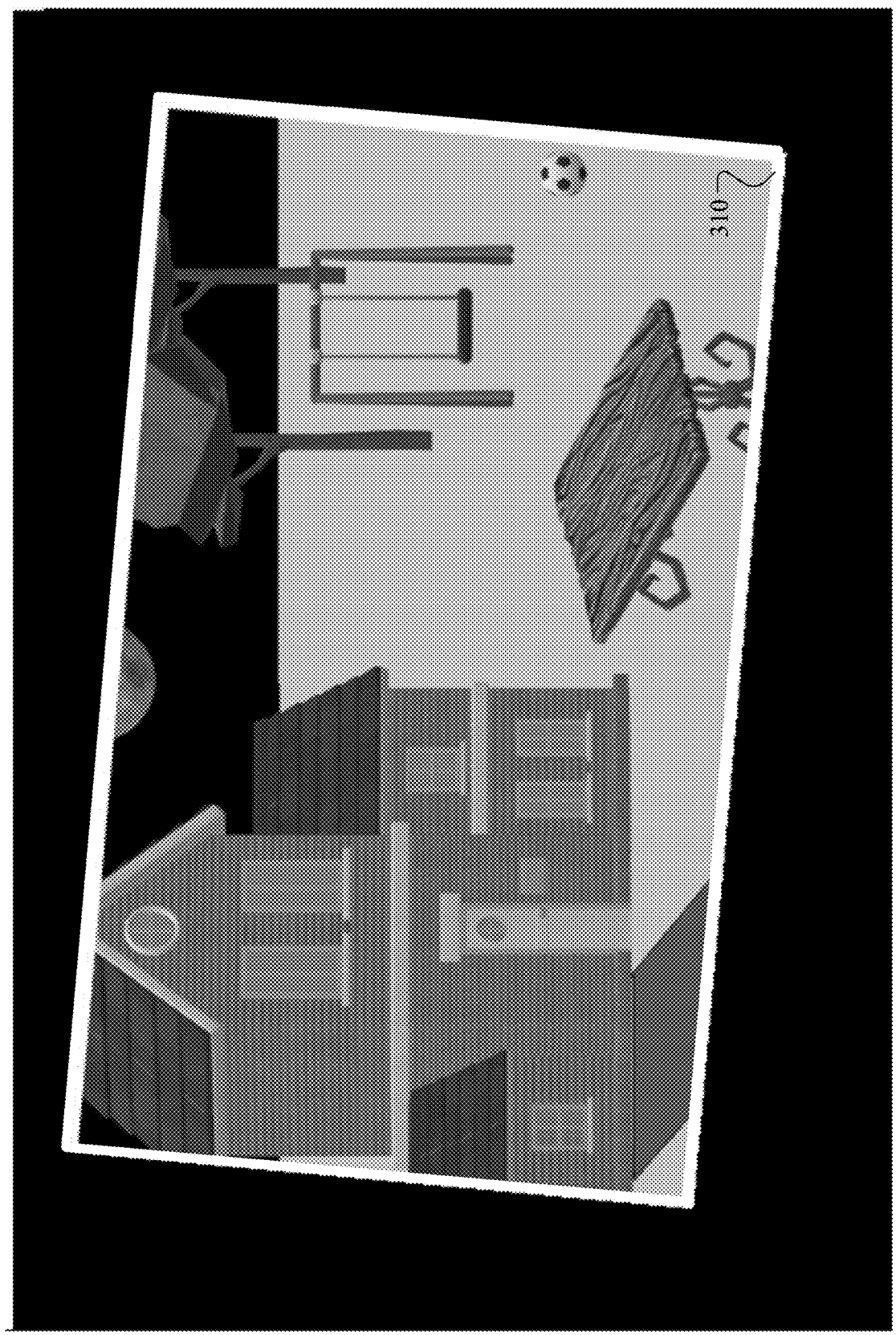
FIG. 3A illustrates an example first-person perspective of the artificial reality environment.

FIG. 3A illustrates an example first-person perspective of the artificial reality environment. As the user 102 moves throughout artificial reality environment 200, the computing system may determine a first-person perspective 310 of the of the user, which may represent the first person perspective of the user 102 experiencing artificial-reality environment 200 while wearing HMD 104. The first-person perspective 310 may be based on the pose of the user 102 or the HMD 104 at a particular time. For example, if the pose of the user changes (e.g., the user crouches, looks up, or turns their head), the first-person perspective 310 may change to account for this change in the pose of the user 102 or HMD 104. As depicted in FIG. 3, user 102 has rotated their head about the roll axis (as depicted in FIG. 1B), resulting in a first-person perspective 310 that is also rotated about the roll axis and not upright with respect to the artificial reality environment 200. In particular embodiments the first-person perspective 310 may be posed (e.g., a particular location and orientation) in the artificial reality-environment. Although FIG. 3A depicts first-person perspective 310 in two dimensions, it should be appreciated that in some embodiments the pose of first-person perspective 310 may comprise three dimensions. As the user 102 moves throughout the environment, the rendering system may generate one or more first-person images of the artificial-reality environment to be displayed on the HMD 104 of the user 102 from the first-person perspective.

Figure 3B:
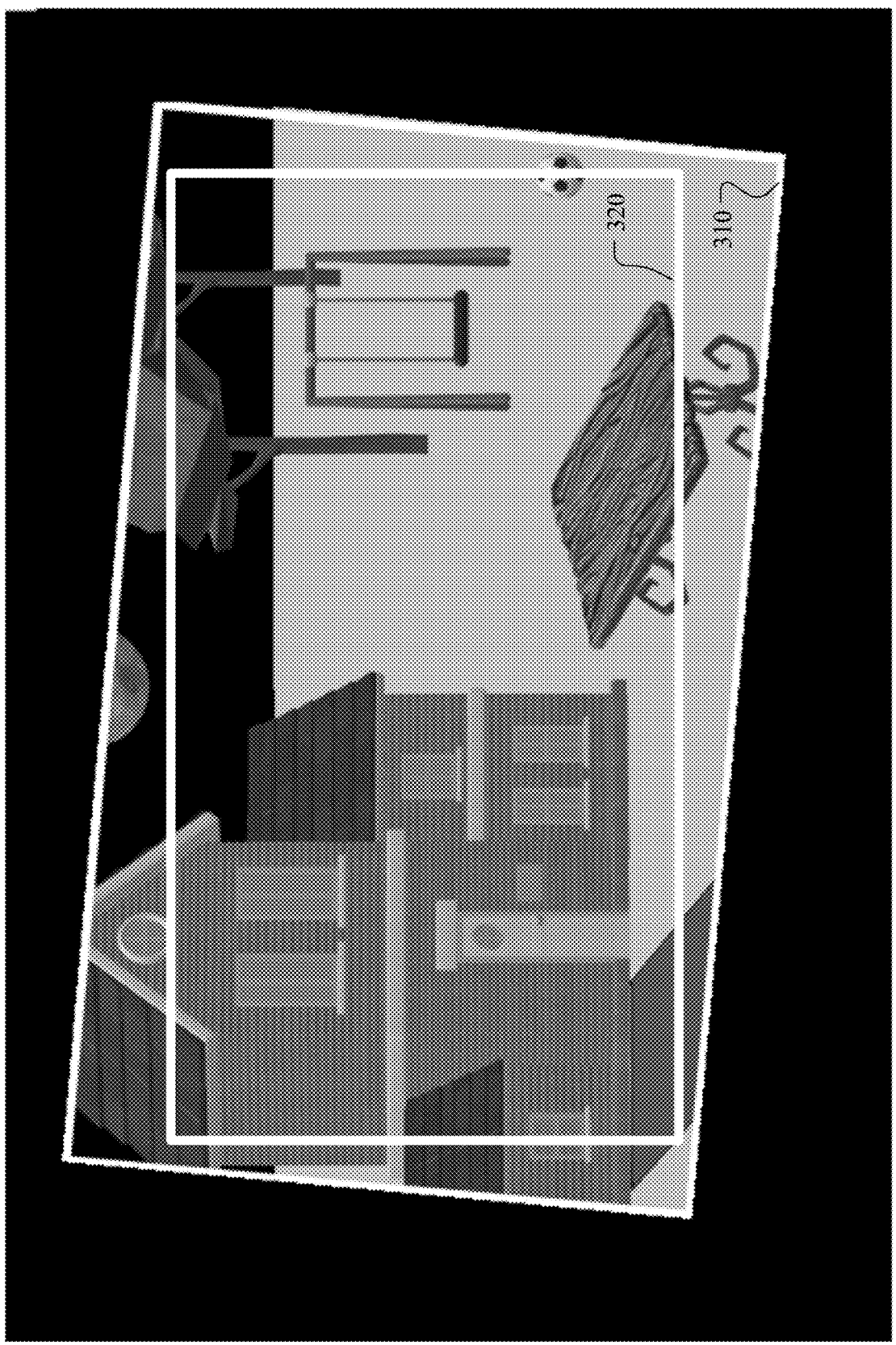
FIG. 3B illustrates an example spectator perspective of the artificial reality environment.

FIG. 3B illustrates an example spectator perspective of the artificial reality environment. In particular embodiments the mirror application may determine a spectator perspective 320. The spectator perspective 320 may permit spectators to observe the artificial reality experience of the user 102 from a perspective similar to the first-person perspective 310 without the sudden shaking or rotations that may be associated with the first-person perspective 310. In particular embodiments, the spectator perspective 320 may be determined based on for example, the pose of the HMD 104 or the pose of the first-person perspective 310 at a particular time. The spectator perspective 320 may be posed (e.g., a particular location and orientation) in the artificial reality-environment. Although FIG. 3B depicts spectator perspective 320 in two dimensions, it should be appreciated that in some embodiments the pose of the spectator perspective 320 may comprise three dimensions.

In particular embodiments, the pose of the spectator perspective 320 may be based in part on the pose of the first-person perspective 310 or the HMD pose. For example, as depicted in FIG. 3B, spectator perspective 320 is co-located in the three-dimensional space at the location of first-person perspective 310. The pose of the spectator perspective 320 may change to account for changes to the pose of first-person perspective 310. For example, if the first-person perspective 310 or HMD pose changes to account for movement of user 102 or HMD 104 (e.g., the user takes several steps in artificial reality environment 200), the pose of spectator perspective 320 may similarly change. Although the pose of spectator perspective 320 may be based in part on the pose of the HMD 104 or the first-person perspective 310, in particular embodiments this stabilization permits the orientation of spectator perspective 320 to differ from the orientation of HMD 104 or first-person perspective 310. This stabilization may reduce sudden shaking or jittering associated with the first-person perspective 310. This stabilization may be performed by a computing system associated with the user or by a computing system associated with a spectator. In particular embodiments the mirror application may stabilize the spectator perspective 320 based on a request from a user 102 or a spectator. An application associated with the artificial reality system may provide user-facing profiles that provide for "mild", "medium", or "aggressive" stabilization, which may vary the amount of stabilization by the computing system.

In particular embodiments the mirror application may utilize one or more processes to stabilize the spectator perspective 320. Determining the spectator perspective 320 may require the mirror application to stabilize the pose of the spectator perspective 320 relative to the first-person perspective 310, through for example a low-pass (or keyhole) stabilization or dampening stabilization in order to reduce or eliminate sudden rotational movements. The mirror application may receive the pose of the HMD 104 or the pose of the first-person perspective 310 at a particular time. Based on this pose, the mirror application may determine and adjust the rotation (either about the roll, pitch, or yaw axis) of the spectator perspective 320.

In some embodiments, the spectator perspective 320 may simply be co-located at the location of the first-person perspective 310 or HMD pose 104. Although co-located, the computing system may remove the rotation of the spectator perspective 320 about any axis, resulting in an upright orientation of the spectator perspective.

In some embodiments, the computing system may use a low-pass (or keyhole filter0 for stabilization. If the mirror application determines the rotation of the HMD 104 or the rotation of the first-person perspective 310 about a particular axis is within a predetermined threshold or tolerance, the computing system may use the first-person perspective 310 may be used to generate an identical spectator perspective 320 (i.e., the first-person perspective 310 and the spectator perspective 320 have the same pose). However, if the rotation of the HMD 104 or the rotation of the first-person perspective 310 about a particular axis exceeds a predetermined threshold or tolerance, the mirror application may generate a stabilized (or un-rotated) spectator perspective 320 by reducing the amount of rotation of the first-person perspective 310 (e.g., a "low-pass" stabilization). In particular embodiments the spectator perspective may be rotated the same amount, or to a lesser-degree than the rotation of first-person perspective 310. Although the rotation of the spectator perspective 320 may be stabilized, it should be appreciated that the location of the spectator perspective 320 may remain identical to the first-person perspective 310 (i.e., there is no translational stabilization).

In particular embodiments the rotation of the spectator perspective 320 may remain fixed such that the artificial reality environment 200 appears upright (e.g., world-locked) when a spectator image is viewed from the spectator perspective 320, no matter how much rotation is applied to first-person perspective 310. Spectator perspective 320 may comprise a predetermined orientation about a view axis, for example the pitch, roll, or yaw axes as depicted in FIG. 1B. For example, in particular embodiments the spectator perspective 320 may be oriented about the roll axis such that its orientation always remains upright with respect to the artificial reality environment 200. As depicted in FIG. 3B, even as the orientation about the roll axis of first-person perspective 310 changes due to, for example, the user 102 turning their head, the orientation of spectator perspective 320 may remain fixed about the roll axis to remain upright with respect to the artificial reality environment 200.

As another example, in particular embodiments the mirror application may utilize a dampening stabilization to stabilize the spectator perspective 320 with respect to first-person perspective 310. The mirror application may receive a first pose of the HMD 104 or a first pose of the first-person perspective 310 at a first time, and a second pose of the HMD 104 or a second pose of the first-person perspective 310 at a second time, and subsequently determine a difference between the pose at the first time and the pose at the second time. If the difference between the first pose and the second pose exceeds a predetermined threshold or tolerance (either overall, or with respect to rotational differentials about one or more axes), the mirror application may generate the spectator perspective 320 at the second time by dampening the rotational movement between the first pose and the second pose of the first-person perspective 310. For example, if the first-person pose or HMD pose at a first time was stationary (e.g., no rotational movement), and the first-person pose or HMD pose at a second time rotated 1 radian about the roll axis, the mirror application may generate a spectator perspective 320 by dampening the HMD pose at the second time about the roll axis based on the historical stationary pose of the first-person pose or HMD pose (e.g., the pose data at the first time and/or pose data at other proceeding times). Thus, instead of the spectator perspective 320 rotating 1 radian about the roll axis to match the pose of the first-person perspective 310 at the second time, the mirror application may dampen the rotation such that the spectator perspective 320 only rotates, for example 0.7 radians. An advantage of dampening stabilization is the spectator perspective 320 can rotate somewhat to mimic the head motion represented by first-person perspective 310, but the rotation is smoother and less drastic.

In particular embodiments the mirror application may further adjust the rendered field-of-view first-person perspective 310 or the spectator perspective 320 to provide a smooth and aesthetically pleasing display of the spectator images. A particular problem presented by the methods described above to generate the spectator perspective 320 is the potential for displaying image borders outside the first-person perspective 310 in the generated spectator image (e.g., "black-pulling"). As depicted in FIG. 3B, if the field-of-view of spectator perspective 320 (which has been stabilized as described above) was identical to first-person perspective 310, the rendered spectator image would include areas outside first-person perspective 310.

To remedy this problem, the mirror application may adjust the field-of-view of either first-person perspective 310 or spectator perspective 320. The mirror application may receive image data and metadata comprising the first-person perspective 310, including a corresponding field-of-view (e.g., camera frustrum parameters) of the first-person perspective 310. In particular embodiments the mirror application may also receive the pose of the HMD 104 or the pose of the first-person perspective 310. Several embodiments are provided to adjust the rendered field-of-view first-person perspective 310 or the spectator perspective 320 to provide a smooth display.

In some embodiments, the mirror application may adjust the image by cropping the field-of-view of either first-person perspective 310 or spectator perspective 320. For example, the mirror application may provide a buffer area by enlarging the field-of-view of first-person perspective 310 (e.g., if the field-of-view of the first-person perspective is 100 degrees, the mirror application may generate the first-person perspective at 110 degrees). As another example (and as depicted in FIG. 3B), the mirror application may maintain the original field-of-view of first-person perspective 310, but use a smaller field-of-view for the spectator perspective 320 (e.g., if the field-of-view of the first-person perspective is 100 degrees, the mirror application may generate the field-of-view of the spectator perspective at 90 degrees). Either method results in a buffer region between the first-person perspective 310 and the spectator perspective 320 that the computing system can use to reduce or eliminate "black pulling." By adjusting the field-of-view of either perspective, the crop will likely be fully contained within the image and there would be little or no black borders. Thus, the field-of-view of spectator perspective 320 may differ from the field-of-view of first-person perspective 310. Although FIG. 3B depicts a spectator perspective 320 with a smaller field of view than the first-person perspective 310, in particular embodiments the field of view of spectator perspective 320 may be larger or identical to the field of view of the first-person perspective 310.

Figure 4B:
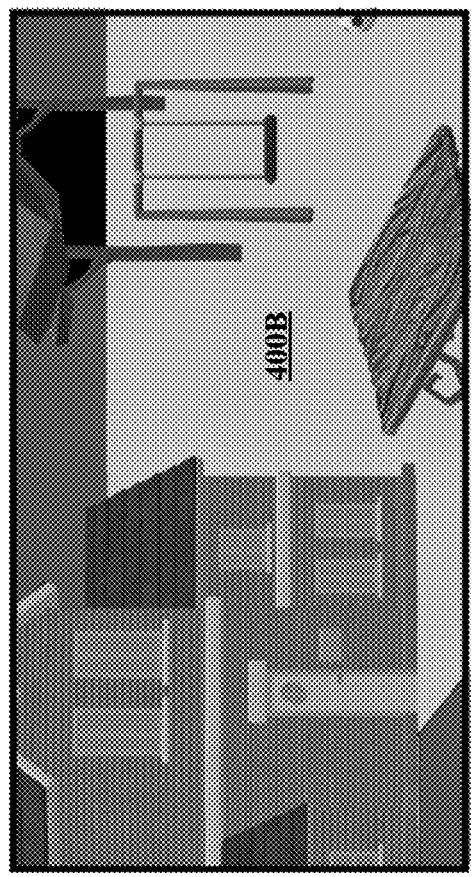
FIG. 4B illustrates a spectator image that captures the first-person image from the spectator perspective.
Figure 4A:
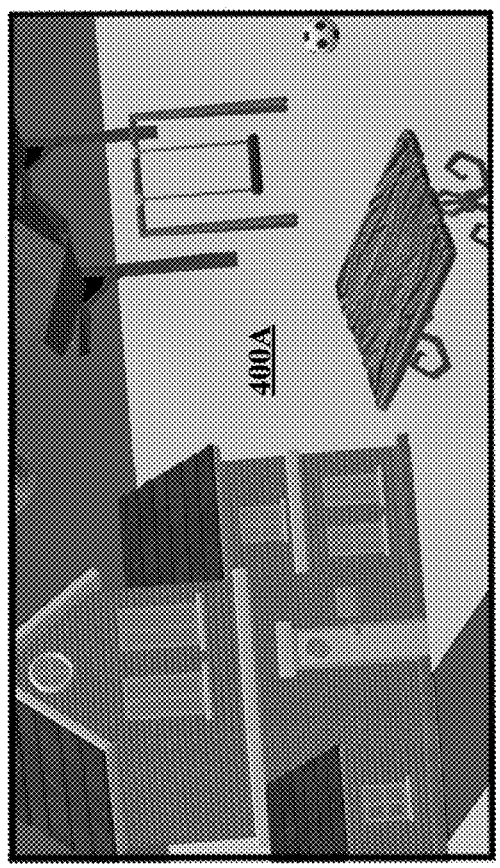
FIG. 4A illustrates a first-person image that captures an artificial-reality environment from a first-person perspective of a user of a head-mounted device.

FIG. 4A illustrates a first-person image that captures an artificial-reality environment from a first-person perspective of a user of a head-mounted device. In particular embodiments a runtime engine may receive and process the rendered first-person images 400A and HMD pose information from the rendering system to generates the first-person images and spectator images of the artificial reality environment. As the user 102 of HMD 104 moves throughout the environment 200, the computing system may receive one or more first-person images 400A of the artificial reality environment 200. The first-person images 400A may be rendered based on the pose of the HMD 104 and represent the appearance of the environment 200 from the first-person perspective 310. FIG. 4B illustrates a spectator image that captures the first-person image from the spectator perspective. In particular embodiments the mirror application may request the runtime engine to provide a spectator image 400B based on the spectator perspective 320. The runtime engine may generate a spectator image 400B that captures the first-person image 400A from the spectator perspective 320. In particular embodiments the mirroring application may receive a spectator perspective 320 and request the runtime to generate and provide a spectator image 400B using the received spectator perspective 320. The spectator image 400B may be rendered based on the pose of the spectator perspective 320 and may capture the appearance of the artificial reality environment as viewed from the spectator perspective 320. In particular embodiments the spectator image 400B may be rendered based on the first-person image 400A. When comparing first-person image 400A to spectator image 400B in FIGS. 4A-B, it should be appreciated that first-person image 400A captures a view from first-person perspective 310 such that its orientation and field-of-view differ from that of spectator image 400B, which captures a view from spectator perspective 320 that provides for stabilized and smooth spectator viewing.

In particular embodiments the computing system may cause the first-person image 400A to be displayed on a device associated with the user, for example HMD 104. The rendering system comprising or associated with the computing system may generate or render the first-person images 400A of the artificial reality environment to be displayed on the HMD 104. In particular embodiments the first-person image 400A may be displayed on a display of the device configured to be viewed by the user. In particular embodiments the computing system may cause the spectator image to be displayed on a device separate from the HMD 104 of the user. The spectator image may be displayed, for example and not by way of limitation, as a live stream of the user's experience, or as a playback of the user's experience. The spectator image may be published online as a video file on, for example, on a website, social-networking application, or news feed. One or more spectators may access the published spectator images for display on a second device, separate from the HMD 104. The second device may comprise a second artificial reality system, a mobile device, a tablet, a television, computer monitor, or similar display for viewing images or video. The second device may comprise a monoscopic display. In particular embodiments the user of the HMD may set one or more permissions and or targets for display of the spectator image. For example, a permission may restrict potential spectators to those who are within a particular group or within a threshold degree of separation from the player in a social-networking system. As another example, a target may specify which spectators or types of spectators (e.g., saved contacts, private lists, etc.) may be shown the spectator image.

Figure 5:
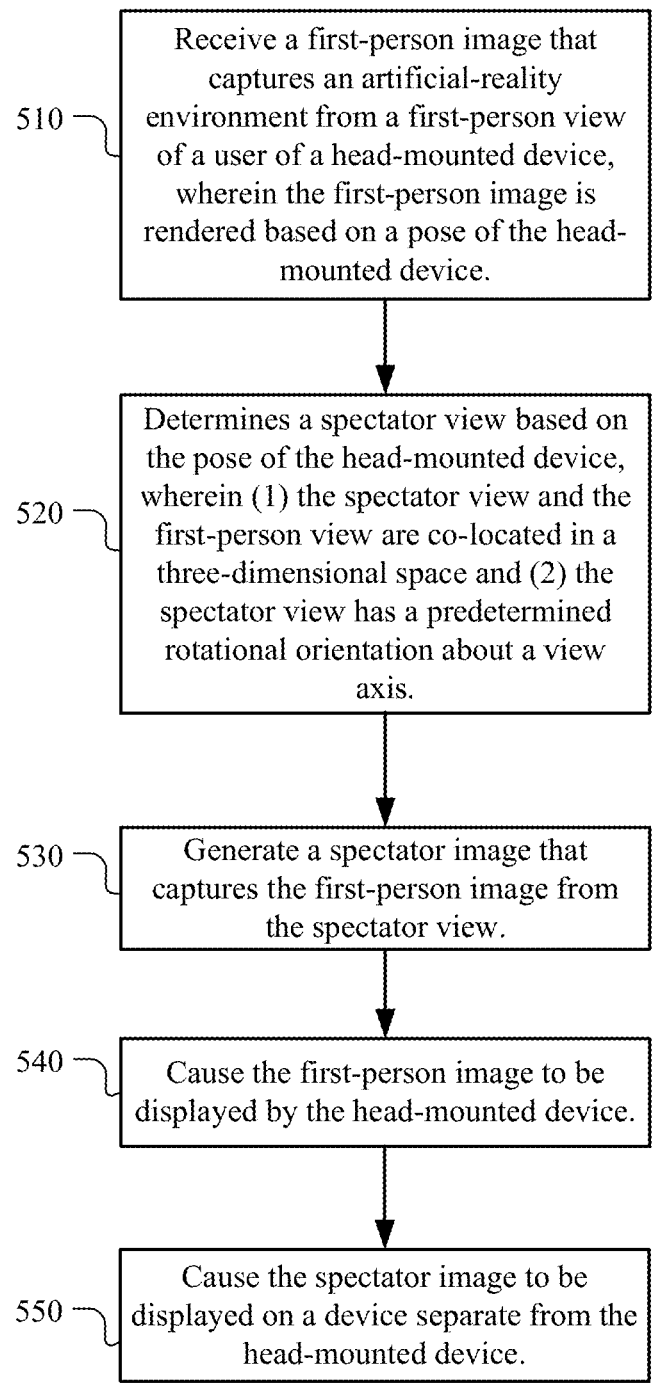
FIG. 5 illustrates an example method for generating spectator images of an artificial reality environment.

FIG. 5 illustrates an example method 500 for generating spectator images of an artificial reality environment. The method may begin at step 510, where a computing system receives a first-person image that captures an artificial-reality environment from a first-person perspective of a user of a head-mounted device, wherein the first-person image is rendered based on a pose of the head-mounted device.

At step 520, a computing system determines a spectator perspective based on the pose of the head-mounted device, wherein (1) the spectator perspective and the first-person perspective are co-located in a three-dimensional space and (2) the spectator perspective has a predetermined rotational orientation about a view axis. For example, in particular embodiments the spectator perspective 320 may be oriented about the roll axis such that its orientation always remains upright with respect to the artificial reality environment 200. In particular embodiments the computing system may further use low-pass stabilization or dampening stabilization to determine the spectator perspective 320. The computing system may further adjust the field-of-view of first-person perspective 310 or spectator perspective 320 to provide a smooth and aesthetically pleasing display.

At step 530, a computing system generates a spectator image that captures the first-person image from the spectator perspective. In particular embodiments the mirroring application may receive a spectator perspective 320 and request the runtime to generate and provide a spectator image 400B using the received spectator perspective 320. The spectator image 400B may be rendered based on the pose of the spectator perspective 320 and may capture the appearance of the artificial reality environment as viewed from the spectator perspective 320.

At step 540, a computing system causes the first-person image to be displayed by the head-mounted device. In particular embodiments the first-person image 400A may be displayed on a display of the device configured to be viewed by the user. At step 550, a computing system causes the spectator image to be displayed on a device separate from the head-mounted device. The spectator image may be displayed, for example and not by way of limitation, as a live stream of the user's experience, or as a playback of the user's experience. The spectator image may be published online as a video file on, for example, on a website, social-networking application, or news feed.

Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for generating spectator images of an artificial reality environment including the particular steps of the method of FIG. 5, this disclosure contemplates any suitable method for generating spectator images of an artificial reality environment including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
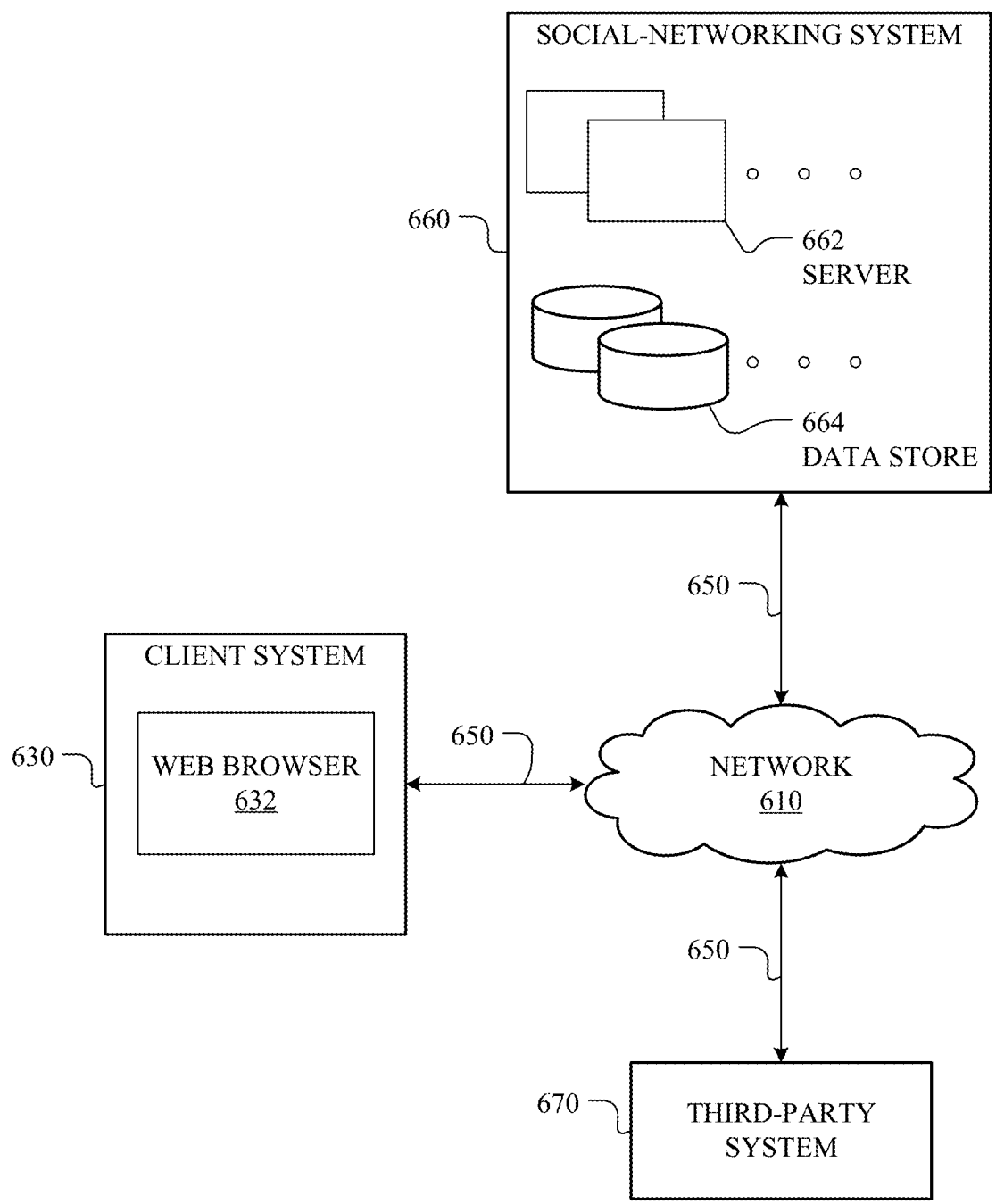
FIG. 6 illustrates an example network environment associated with a social-networking system.

FIG. 6 illustrates an example network environment 600 associated with a social-networking system. Network environment 600 includes a client system 630, a social-networking system 660, and a third-party system 670 connected to each other by a network 610. Although FIG. 6 illustrates a particular arrangement of client system 630, social-networking system 660, third-party system 670, and network 610, this disclosure contemplates any suitable arrangement of client system 630, social-networking system 660, third-party system 670, and network 610. As an example and not by way of limitation, two or more of client system 630, social-networking system 660, and third-party system 670 may be connected to each other directly, bypassing network 610. As another example, two or more of client system 630, social-networking system 660, and third-party system 670 may be physically or logically co-located with each other in whole or in part. Moreover, although FIG. 6 illustrates a particular number of client systems 630, social-networking systems 660, third-party systems 670, and networks 610, this disclosure contemplates any suitable number of client systems 630, social-networking systems 660, third-party systems 670, and networks 610. As an example and not by way of limitation, network environment 600 may include multiple client system 630, social-networking systems 660, third-party systems 670, and networks 610.

This disclosure contemplates any suitable network 610. As an example and not by way of limitation, one or more portions of network 610 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 610 may include one or more networks 610.

Links 650 may connect client system 630, social-networking system 660, and third-party system 670 to communication network 610 or to each other. This disclosure contemplates any suitable links 650. In particular embodiments, one or more links 650 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 650 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 650, or a combination of two or more such links 650. Links 650 need not necessarily be the same throughout network environment 600. One or more first links 650 may differ in one or more respects from one or more second links 650.

In particular embodiments, client system 630 may be an electronic device including hardware, software, or embedded logic components or a combination of two or more such components and capable of carrying out the appropriate functionalities implemented or supported by client system 630. As an example and not by way of limitation, a client system 630 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 630. A client system 630 may enable a network user at client system 630 to access network 610. A client system 630 may enable its user to communicate with other users at other client systems 630.

In particular embodiments, client system 630 may include a web browser 632, and may have one or more add-ons, plug-ins, or other extensions. A user at client system 630 may enter a Uniform Resource Locator (URL) or other address directing the web browser 632 to a particular server (such as server 662, or a server associated with a third-party system 670), and the web browser 632 may generate a Hyper Text Transfer Protocol (HTTP) request and communicate the HTTP request to server. The server may accept the HTTP request and communicate to client system 630 one or more Hyper Text Markup Language (HTML) files responsive to the HTTP request. Client system 630 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts, combinations of markup language and scripts, and the like. Herein, reference to a webpage encompasses one or more corresponding webpage files (which a browser may use to render the webpage) and vice versa, where appropriate.

In particular embodiments, social-networking system 660 may be a network-addressable computing system that can host an online social network. Social-networking system 660 may generate, store, receive, and send social-networking data, such as, for example, user-profile data, concept-profile data, social-graph information, or other suitable data related to the online social network. Social-networking system 660 may be accessed by the other components of network environment 600 either directly or via network 610. As an example and not by way of limitation, client system 630 may access social-networking system 660 using a web browser 632, or a native application associated with social-networking system 660 (e.g., a mobile social-networking application, a messaging application, another suitable application, or any combination thereof) either directly or via network 610. In particular embodiments, social-networking system 660 may include one or more servers 662. Each server 662 may be a unitary server or a distributed server spanning multiple computers or multiple datacenters. Servers 662 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 662 may include hardware, software, or embedded logic components or a combination of two or more such components for carrying out the appropriate functionalities implemented or supported by server 662. In particular embodiments, social-networking system 660 may include one or more data stores 664. Data stores 664 may be used to store various types of information. In particular embodiments, the information stored in data stores 664 may be organized according to specific data structures. In particular embodiments, each data store 664 may be a relational, columnar, correlation, or other suitable database. Although this disclosure describes or illustrates particular types of databases, this disclosure contemplates any suitable types of databases. Particular embodiments may provide interfaces that enable a client system 630, a social-networking system 660, or a third-party system 670 to manage, retrieve, modify, add, or delete, the information stored in data store 664.

In particular embodiments, social-networking system 660 may store one or more social graphs in one or more data stores 664. In particular embodiments, a social graph may include multiple nodes—which may include multiple user nodes (each corresponding to a particular user) or multiple concept nodes (each corresponding to a particular concept)—and multiple edges connecting the nodes. Social-networking system 660 may provide users of the online social network the ability to communicate and interact with other users. In particular embodiments, users may join the online social network via social-networking system 660 and then add connections (e.g., relationships) to a number of other users of social-networking system 660 to whom they want to be connected. Herein, the term "friend" may refer to any other user of social-networking system 660 with whom a user has formed a connection, association, or relationship via social-networking system 660.

In particular embodiments, social-networking system 660 may provide users with the ability to take actions on various types of items or objects, supported by social-networking system 660. As an example and not by way of limitation, the items and objects may include groups or social networks to which users of social-networking system 660 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 660 or by an external system of third-party system 670, which is separate from social-networking system 660 and coupled to social-networking system 660 via a network 610.

In particular embodiments, social-networking system 660 may be capable of linking a variety of entities. As an example and not by way of limitation, social-networking system 660 may enable users to interact with each other as well as receive content from third-party systems 670 or other entities, or to allow users to interact with these entities through an application programming interfaces (API) or other communication channels.

In particular embodiments, a third-party system 670 may include one or more types of servers, one or more data stores, one or more interfaces, including but not limited to APIs, one or more web services, one or more content sources, one or more networks, or any other suitable components, e.g., that servers may communicate with. A third-party system 670 may be operated by a different entity from an entity operating social-networking system 660. In particular embodiments, however, social-networking system 660 and third-party systems 670 may operate in conjunction with each other to provide social-networking services to users of social-networking system 660 or third-party systems 670. In this sense, social-networking system 660 may provide a platform, or backbone, which other systems, such as third-party systems 670, may use to provide social-networking services and functionality to users across the Internet.

In particular embodiments, a third-party system 670 may include a third-party content object provider. A third-party content object provider may include one or more sources of content objects, which may be communicated to a client system 630. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 660 also includes user-generated content objects, which may enhance a user's interactions with social-networking system 660. User-generated content may include anything a user can add, upload, send, or "post" to social-networking system 660. As an example and not by way of limitation, a user communicates posts to social-networking system 660 from a client system 630. Posts may include data such as status updates or other textual data, location information, photos, videos, links, music or other similar data or media. Content may also be added to social-networking system 660 by a third-party through a "communication channel," such as a newsfeed or stream.

In particular embodiments, social-networking system 660 may include a variety of servers, sub-systems, programs, modules, logs, and data stores. In particular embodiments, social-networking system 660 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 660 may also include suitable components such as network interfaces, security mechanisms, load balancers, failover servers, management-and-network-operations consoles, other suitable components, or any suitable combination thereof. In particular embodiments, social-networking system 660 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 660 to one or more client systems 630 or one or more third-party system 670 via network 610. The web server may include a mail server or other messaging functionality for receiving and routing messages between social-networking system 660 and one or more client systems 630. An API-request server may allow a third-party system 670 to access information from social-networking system 660 by calling one or more APIs. An action logger may be used to receive communications from a web server about a user's actions on or off social-networking system 660. In conjunction with the action log, a third-party-content-object log may be maintained of user exposures to third-party-content objects. A notification controller may provide information regarding content objects to a client system 630. Information may be pushed to a client system 630 as notifications, or information may be pulled from client system 630 responsive to a request received from client system 630. Authorization servers may be used to enforce one or more privacy settings of the users of social-networking system 660. A privacy setting of a user determines how particular information associated with a user can be shared. The authorization server may allow users to opt in to or opt out of having their actions logged by social-networking system 660 or shared with other systems (e.g., third-party system 670), such as, for example, by setting appropriate privacy settings. Third-party-content-object stores may be used to store content objects received from third parties, such as a third-party system 670. Location stores may be used for storing location information received from client systems 630 associated with users. Advertisement-pricing modules may combine social information, the current time, location information, or other suitable information to provide relevant advertisements, in the form of notifications, to a user.

Figure 7:
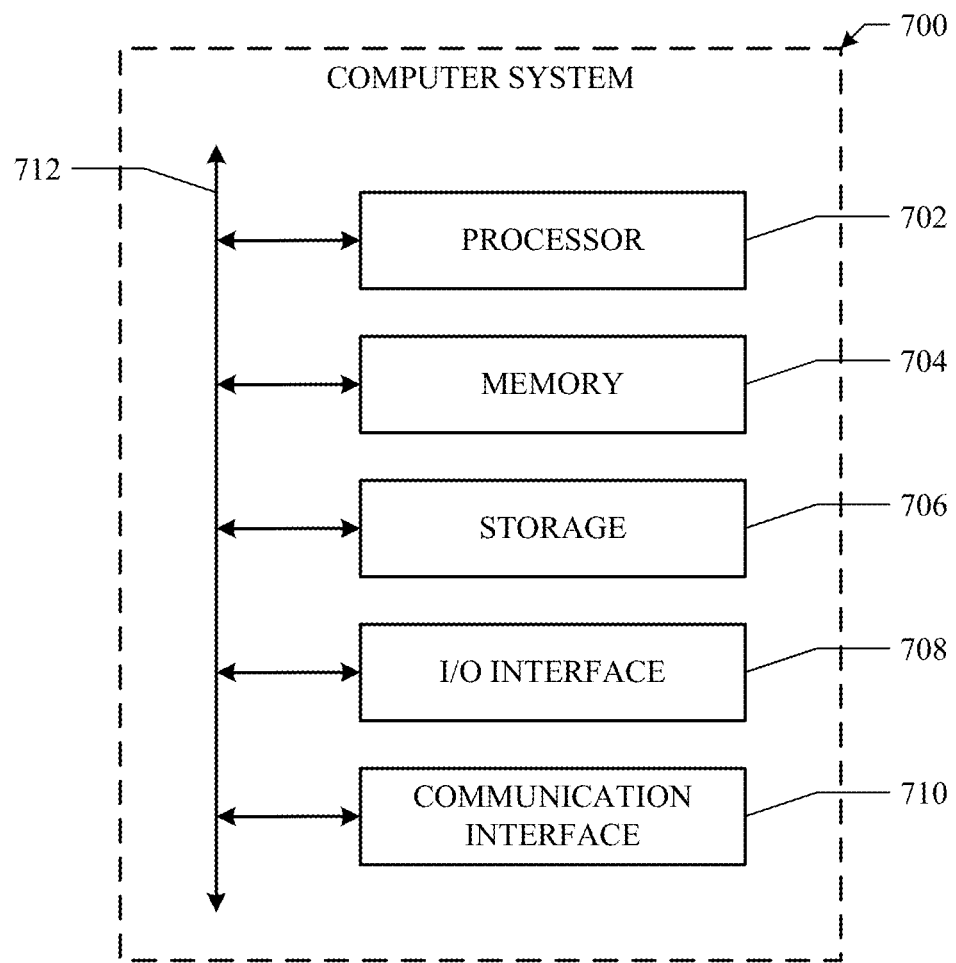
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A method comprising, by a computing system:
   receiving a first-person image that captures an artificial-reality environment from a first-person perspective of a user of a head-mounted device, wherein the first-person image is rendered based on a pose of the head-mounted device;
   determining a spectator perspective based on the pose of the head-mounted device, wherein (1) the spectator perspective and the first-person perspective are co-located in a three-dimensional space and (2) the spectator perspective has a predetermined rotational orientation about a view axis;
   generating a spectator image that captures the first-person image from the spectator perspective;
   causing the first-person image to be displayed by the head-mounted device; and
   causing the spectator image to be displayed on a device separate from the head-mounted device.

2. The method of claim 1, wherein the predetermined rotational orientation of the spectator perspective is fixed, and the first-person perspective has a rotational orientation about the view axis of the user that changes depending on the pose of the head-mounted device.

3. The method of claim 1, wherein the pose of the head-mounted device is used to determine, for the first-person perspective, first rotational orientations about the view axis, a pitch axis, and a yaw axis.

4. The method of claim 3, wherein the spectator perspective comprises second rotational orientations about the pitch axis and the yaw axis that are respectively determined based on the first rotational orientations of the first-person perspective about the pitch axis and the yaw axis.

5. The method of claim 1, wherein the predetermined rotational orientation about the view axis is zero.

6. The method of claim 1, further comprising adjusting a field of view of the spectator perspective, wherein the adjusted field-of-view of the spectator perspective is less than a field-of-view of the first-person perspective.

7. The method of claim 1, wherein determining the spectator perspective is performed by a mirror application associated with the computing system.

8. The method of claim 1, wherein generating the spectator image is performed by a runtime engine associated with the computing system.

9. One or more computer-readable non-transitory storage media embodying software that is operable when executed to:
   receive a first-person image that captures an artificial-reality environment from a first-person perspective of a user of a head-mounted device, wherein the first-person image is rendered based on a pose of the head-mounted device;
   determine a spectator perspective based on the pose of the head-mounted device, wherein (1) the spectator perspective and the first-person perspective are co-located in a three-dimensional space and (2) the spectator perspective has a predetermined rotational orientation about a view axis;
   generate a spectator image that captures the first-person image from the spectator perspective;
   cause the first-person image to be displayed by the head-mounted device; and
   cause the spectator image to be displayed on a device separate from the head-mounted device.

10. The media of claim 9, wherein the predetermined rotational orientation of the spectator perspective is fixed, and the first-person perspective has a rotational orientation about the view axis of the user that changes depending on the pose of the head-mounted device.

11. The media of claim 9, wherein the pose of the head-mounted device is used to determine, for the first-person perspective, first rotational orientations about the view axis, a pitch axis, and a yaw axis.

12. The media of claim 11, wherein the spectator perspective comprises second rotational orientations about the pitch axis and the yaw axis that are respectively determined based on the first rotational orientations of the first-person perspective about the pitch axis and the yaw axis.

13. The media of claim 11, wherein the predetermined rotational orientation about the view axis is zero.

14. The media of claim 9, wherein the software is further operable when executed to adjust a field of view of the spectator perspective, wherein the adjusted field-of-view of the spectator perspective is less than a field-of-view of the first-person perspective.

15. A system comprising:
   one or more processors; and
   one or more computer-readable non-transitory storage media coupled to one or more of the processors and comprising instructions operable when executed by one or more of the processors to cause the system to:
   receive a first-person image that captures an artificial-reality environment from a first-person perspective of a user of a head-mounted device, wherein the first-person image is rendered based on a pose of the head-mounted device;
   determine a spectator perspective based on the pose of the head-mounted device, wherein (1) the spectator perspective and the first-person perspective are co-located in a three-dimensional space and (2) the spectator perspective has a predetermined rotational orientation about a view axis;

generate a spectator image that captures the first-person image from the spectator perspective;

cause the first-person image to be displayed by the head-mounted device; and cause the spectator image to be displayed on a device separate from the head-mounted device.

16. The system of claim 15, wherein the predetermined rotational orientation of the spectator perspective is fixed, and the first-person perspective has a rotational orientation about the view axis of the user that changes depending on the pose of the head-mounted device.

17. The system of claim 15, wherein the pose of the head-mounted device is used to determine, for the first-person perspective, first rotational orientations about the view axis, a pitch axis, and a yaw axis.

18. The system of claim 17, wherein the spectator perspective comprises second rotational orientations about the pitch axis and the yaw axis that are respectively determined based on the first rotational orientations of the first-person perspective about the pitch axis and the yaw axis.

19. The system of claim 17, wherein the predetermined rotational orientation about the view axis is zero.

20. The system of claim 15, wherein the processors are further operable when executing the instructions to adjust a field of view of the spectator perspective, wherein the adjusted field-of-view of the spectator perspective is less than a field-of-view of the first-person perspective.

* * * * *